United States Patent
Chen et al.

[11] Patent Number: 5,913,386
[45] Date of Patent: Jun. 22, 1999

[54] CUSHION MECHANISM FOR A BRAKE OF A BICYCLE

[75] Inventors: Caesar Chen; Chung-ping Chiang, both of Hsinchu, Taiwan

[73] Assignee: Industrial Technology Research Institute, Hsinchu, Taiwan

[21] Appl. No.: 09/151,382

[22] Filed: Sep. 10, 1998

[51] Int. Cl.⁶ ........................................ B62L 1/10
[52] U.S. Cl. ........................ 188/24.12; 188/24.22
[58] Field of Search ........................ 188/24.11, 24.12, 188/24.19, 24.21, 24.22, 73.1

[56] References Cited

U.S. PATENT DOCUMENTS

| | | | |
|---|---|---|---|
| 3,305,048 | 2/1967 | Brilando | 188/24.12 |
| 4,136,759 | 1/1979 | Schoch | 188/24.12 |
| 4,351,418 | 9/1982 | Woodring et al. | 188/24.22 |
| 4,441,592 | 4/1984 | Everett | 188/24.12 |
| 4,585,094 | 4/1986 | Rottenkolber et al. | 188/24.22 |
| 4,597,474 | 7/1986 | Nagano | 188/24.21 |
| 4,615,415 | 10/1986 | Mathauser | 188/24.21 |
| 5,082,092 | 1/1992 | Yoshigai | 188/24.21 |
| 5,813,501 | 9/1998 | Terry, Sr. | 188/24.22 |

*Primary Examiner*—Chris Schwartz
*Attorney, Agent, or Firm*—W. Wayne Liauh

[57] ABSTRACT

The present invention relates to a cushion mechanism for a brake of a bicycle, comprising a brake block, an elastomer, a sleeve, and an adjustable nut. The brake block includes an engaging end which extends through the elastomer and the sleeve and is engaged with the adjustable nut. Then the cushion mechanism is installed on a brake caliper. The cushion mechanism of the brake is constructed to prevent a sudden lock of the wheel upon an emergency brake and such an effect is achieved by mounting an elastomer between the brake block and the brake caliper. The elastomer is preset with pressure while being assembled. The preset pressure enables the elastomer to absorb a less force caused by braking when under normal braking operation; and enables the same elastomer to absorb excess force when the braking force exceeds the normal range. Thus, the braking force will not reduce, and the safety for the rider is secured.

13 Claims, 8 Drawing Sheets

CUSHION MECHANISM FOR A BRAKE OF A BICYCLE

FIELD OF THE INVENTION

This invention relates generally to an improvement of a brake block for a brake of a bicycle, in which a cushion mechanism is introduced and the brake block, together with the cushion mechanism, is mounted on a brake caliper.

BACKGROUND OF THE INVENTION

A conventional brake of a bicycle functions as the rider clutches a brake, the brake lever then draws a pair of brake blocks via brake cable to press both sides of the rim of a wheel, a frictional force thus caused may stop rotation of the rim forcibly. As riding a bicycle would consume a lot of energy of the rider, the bicycle must be lighter in weight to save the rider's stamina. To achieve this object, a bicycle must be constructed by simple components and the same applies to the design of the brake mechanism. Though the speed of a bicycle is lower than that of a motorbike, it may still build up considerable speed when riding at a dash, thus it still needs great brake power to secure the safety of a rider.

Thus, the brake mechanism should be designed in order to obtain higher braking force with a limited gripping force. A conventional brake system achieves the effect by using the principle of leverage for which the push arm is longer than a pull arm. It has one other advantage, that is, it provides a sensitive touch of a brake system, but on the other hand, this design tends to lock a rim upon an emergency brake, i.e., the rim ceases rotating instantaneously, and may cause the bicycle to turn over. Further, the rim may be distorted and deformed seriously by the sudden and strong braking force, thus significantly reduce the safety of the rider.

SUMMARY OF THE INVENTION

Therefore, to overcome the above problems of locking a rim during braking, a cushion mechanism is introduced in the invention, which is located between the brake block and the brake caliper. When the cushion mechanism is assembled, a preset pressure is applied to the elastomer with a value slightly less than a value which may lock the rim. Under normal condition, the elastomer is preset with the pressure so as not to adversely affect the existing brake system in reducing speed. During an emergency brake, even though the brake block applies an excess force onto the rim, that is, larger than the preset pressure, the excessive force will be absorbed by the elastomer, and be converted and stored as potential energy (or strain energy). Thus the force exerted onto the rim by the brake block will remain below the value at which a lock of the rim may happen, and until the brake lever is released, the elastomer releases the energy stored therein and return to its orginal shape. The invention can achieve above objects, and has the following benefits: when the brake levers are released slightly, part of the energy absorbed by the elastomer will be released in order to keep an adequate braking force and maintain good brake efficiency.

DESCRIPTION OF A PREFERRED EMBODIMENT

Figure 1:
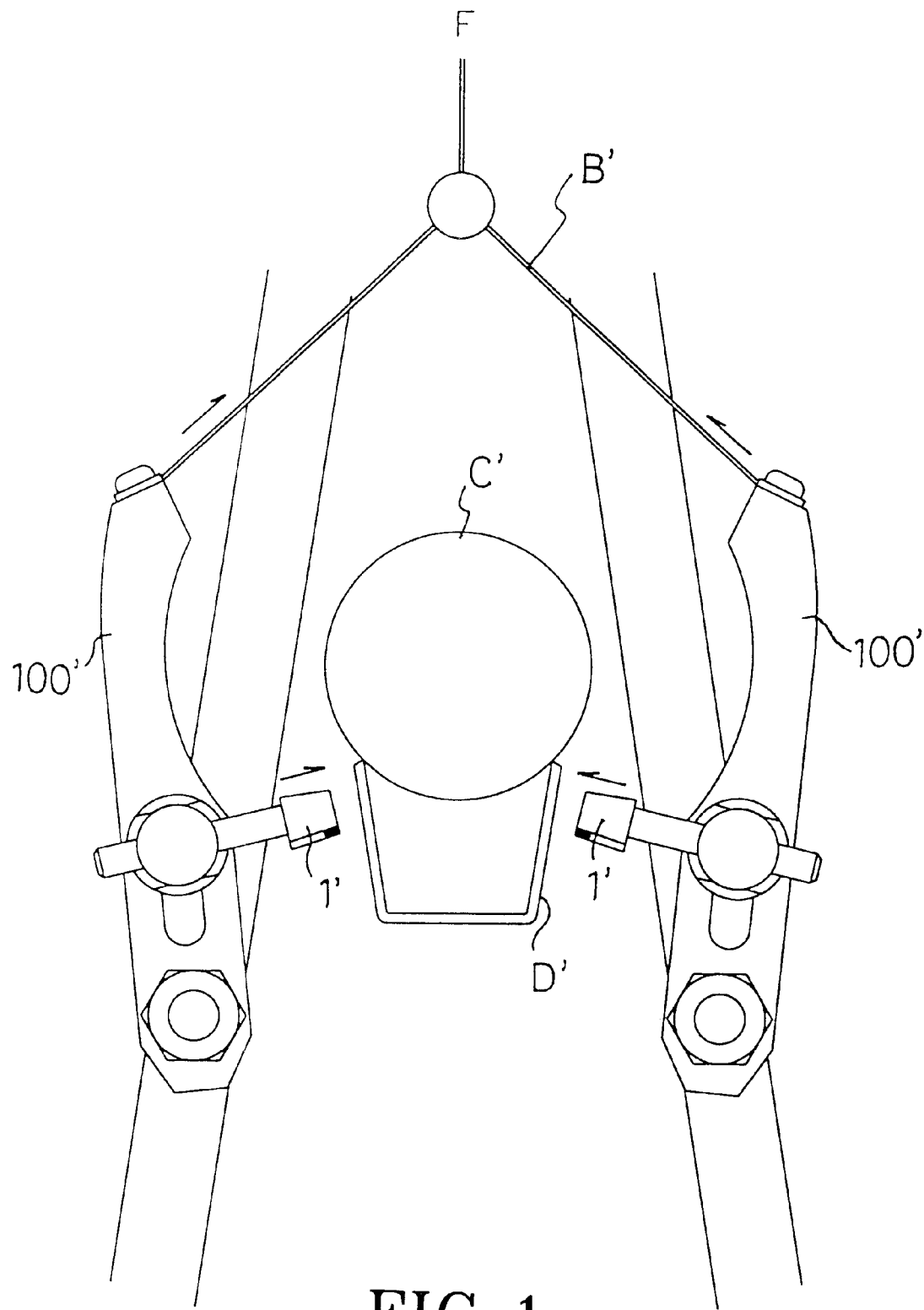
FIG. 1 shows a prior art brake.

FIG. 1 shows a prior art brake, wherein a pair of brake blocks 1' are fastened on brake calipers 100' individually. When a rider clutches a handle-bar brake lever (not shown) to trigger the brake, the brake lever will draw brake cable B' and in turn pull the brake calipers 100', thus press the brake blocks fastened on the brake lever inwardly against both side-walls of the rim D' of the tire C' to generate a frictional force and obtain braking effect. Normally, such a way of braking would achieve its purpose. However, during in an emergency brake, it tends to lock the rim with an overloaded braking force, or to deform and distort the rim.

Figure 2:
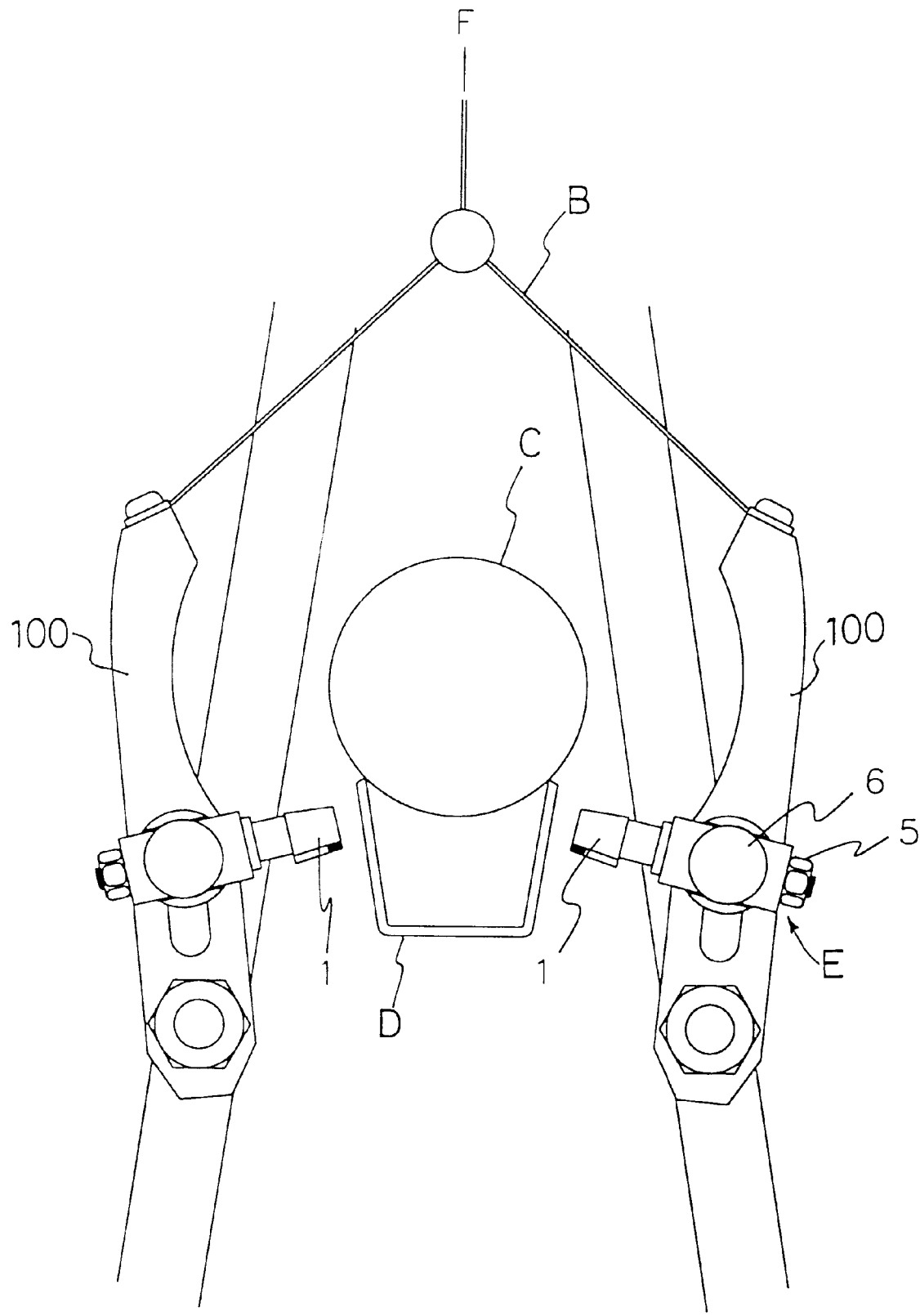
FIG. 2 shows a brake with a cushion mechanism.
Figure 3:
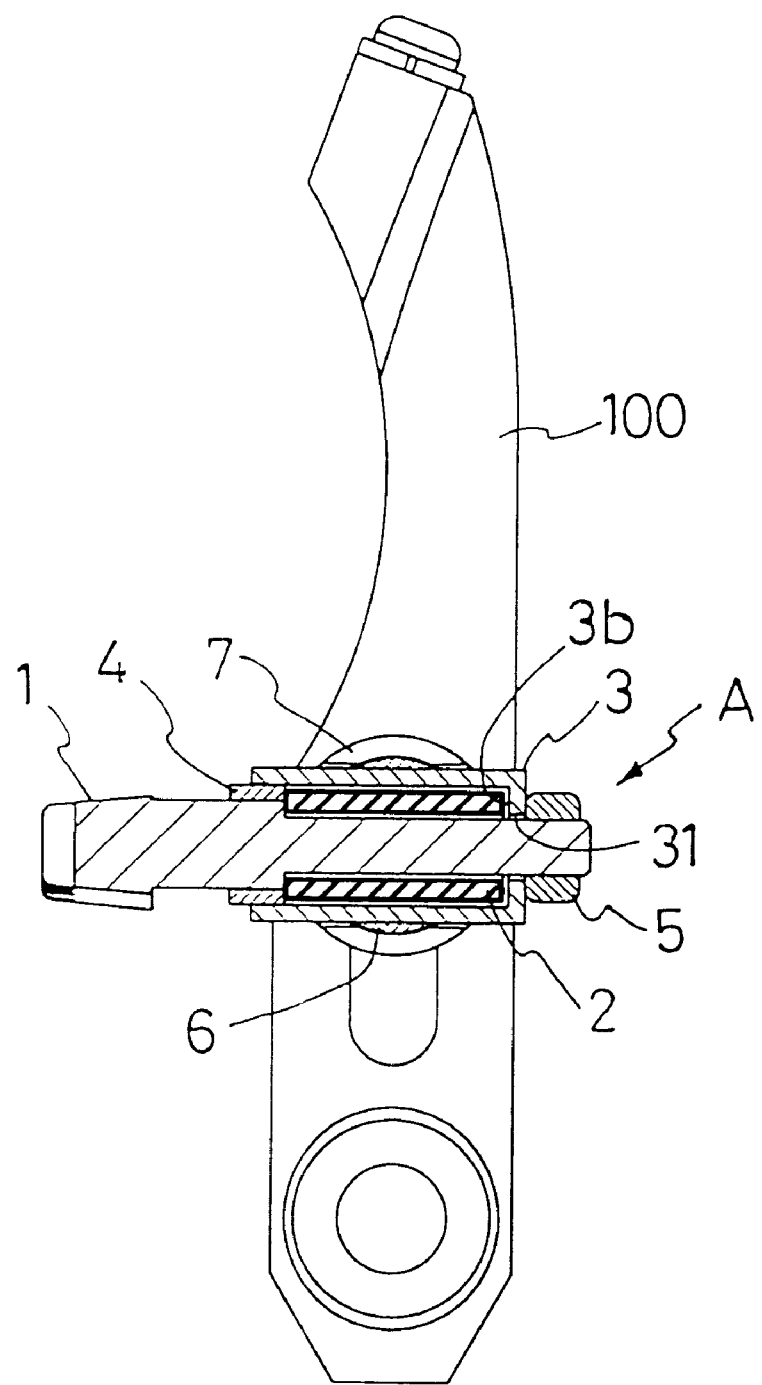
FIG. 3 is a sectional view of the cushion mechanism.
Figure 4:
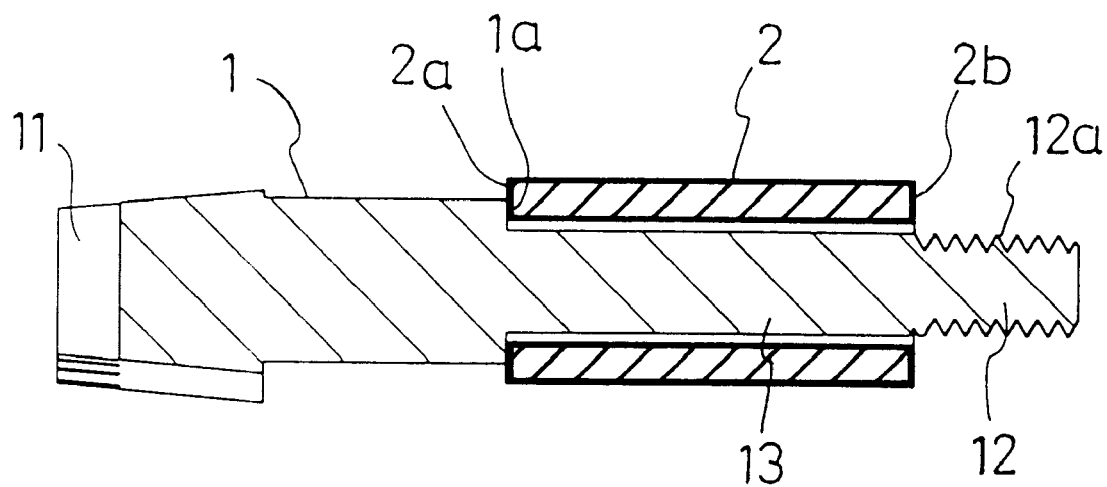
FIG. 4 shows the assembly of the brake block and the elastomer.
Figure 5:
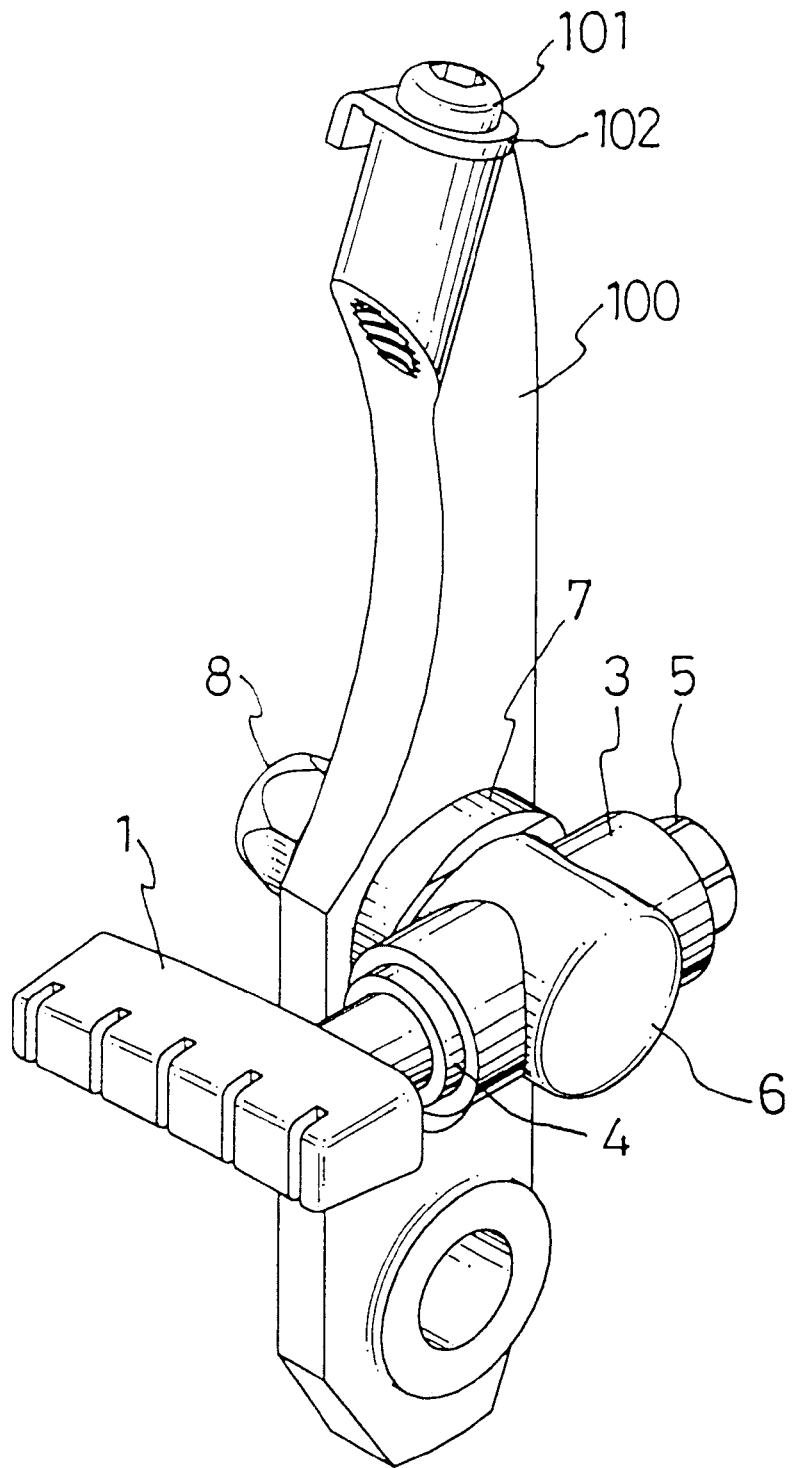
FIG. 5 shows the assembly of the cushion mechanism.
Figure 6:
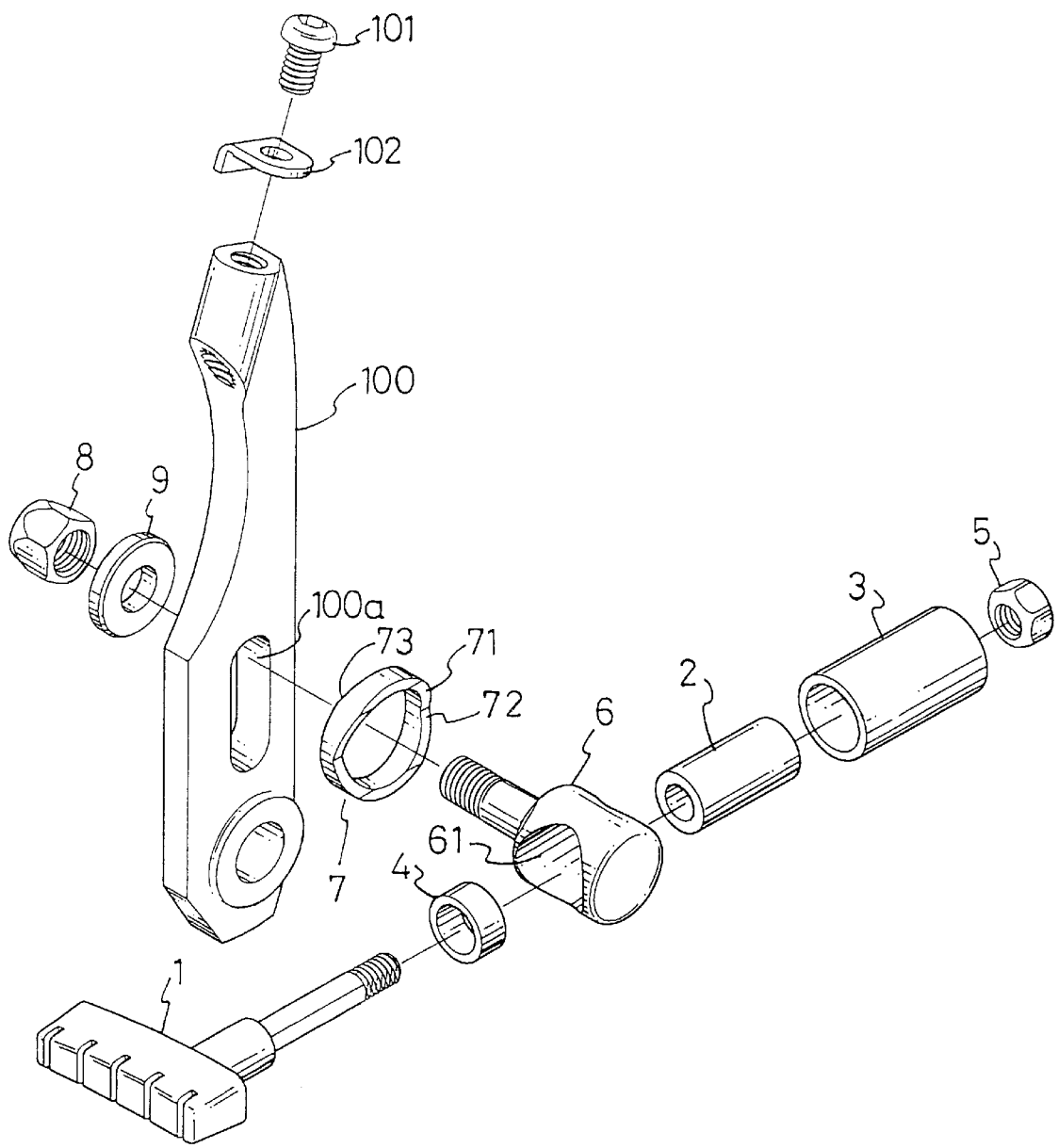
FIG. 6 is an exploded perspective view of the cushion mechanism.

FIG. 2 shows a brake of the present invention, wherein a cushion mechanism E is additionally provided between a brake block 1 and a brake caliper 100, the details are shown in FIGS. 3 and 4. The brake block 1 generally has two parts: one is a rim contacting end 11, and the other is an engaging end. On the axle 13 of the brake block is a shoulder 1a which abuts an end face 2a of an elastomer 2. The axle 13 extends through the elastomer 2 and a sleeve 3, the end face 2b of the elastomer 2 abuts an inside face 3b of the sleeve 3 to form the cushion mechanism E. Engaging means (screw) 12 of the brake block 1 extends through an aperture 31 of the sleeve and is engaged with an adjustable locking means (adjustable nut) 5 to form a brake mechanism A so that the elastomer 2 is positioned between the brake 1 and the sleeve 3. A preset pressure is applied to the elastomer 2 when the nut 5 is locked, a value of this preset pressure is less than the value that a lock of the rims happens. Referring to FIGS. 5 and 6, when the brake mechanism A is assembled, it is first placed through a hole 61 of a fixed bolt 6, the fixed bolt 6 in turn protrudes through a set washer 7, a slot 100a of the brake caliper 100, and a washer 9, to engage with a set nut 8 which fastens the overall mechanism A to the brake caliper 100.

As shown in FIG. 3, to prevent foreign substance from entering into the sleeve 3, a bushing 4 is provided between the brake block 1 and the elastomer 2. In a preferred condition, an inner diameter and an outer diameter of the bushing 4 should be matched respectively to an outer diameter of the brake block 1 and an inner diameter of the sleeve 3, and a clearance between them is as small as possible but should not interfere axial motion of the brake block 1.

Figure 7:
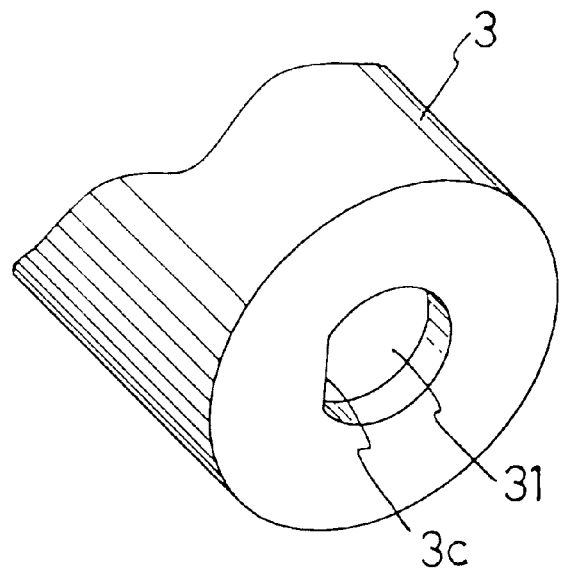
FIG. 7 is a detailed view of an aperture of an end face of a sleeve.
Figure 8:
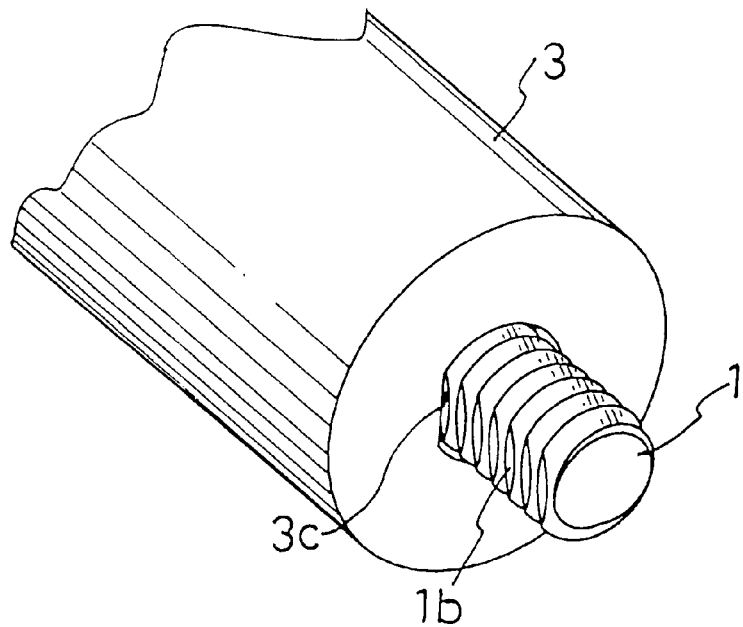
FIG. 8 shows the assembly of the brake block and the sleeve.

As shown in FIGS. 7 and 8, to prevent relative rotation between the brake block 1 and the sleeve 3, a plane 1b is formed on the screwed end of the brake block 1 and a plane 3c is formed at the aperture 31 of the sleeve 3, whereby both of them will not have any relative rotation and thus secures the brake block 1 to remain at its position. The set washer 7 has an arcuate surface 73 on one end to abut the slot 100a of the arm 100, and has a V-shaped cut formed by surfaces 71 and 72 on another end. When the nut 8 engages with the fixed bolt 6 tightly, the surfaces 71 and 72 will abut the peripheral surface of the sleeve 3 intimately, thus fastening the sleeve 3 in place.

Figure 9:
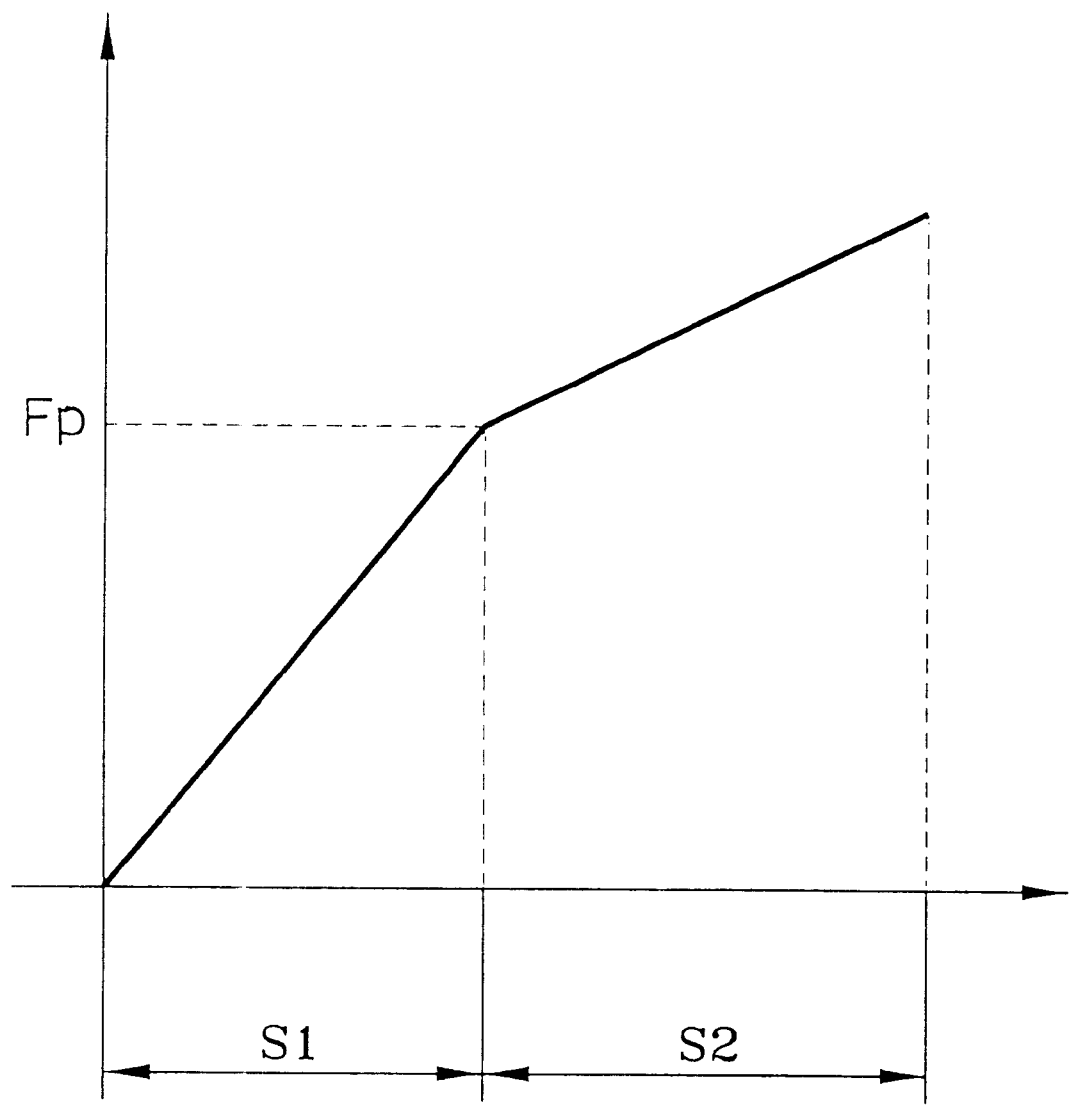
FIG. 9 is a diagram of deformation vs. force exerted on the elastomer.

FIG. 9 is a diagram illustrating deformation and preset pressure of the elastomer, wherein S1 is an amount of deformation of the elastomer 2 after the preset pressure Fp is applied, S2 is an amount of deformation of the elastomer 2 when a pulling force from the brake cable is greater than the preset pressure. When the brake caliper 100 receives the pulling force from the brake cable, the brake caliper 100 then actuates overall brake mechanism A to squeeze the rim D, wherein the brake blocks 1 contact the rim D and the pulling force from the brake cable B is almost transferred to the rim D, because the force exerted on the rim D by the block 1 is still less than the pressure Fp, thus resulting in deceleration of the bicycle. If the pulling force from the brake cable B continues to increase, and the force exerted on the rim D by the block 1 is greater than the pressure Fp, the elastomer 2 will begin to be compressed, i.e., the elastomer 2 receives overloaded force. As the range of the force exceeds the preset pressure Fp is absorbed by the elastomer 2, in the meantime the force exerted on the rim D by the block is reduced, as shown in FIG. 9, the pressure in the range of deformation S2 is reduced. Therefore, the force exerted on the rim D by the block 1 may not exceed the force which locks the rim by the brake block, the safety of the rider may thus be assured. When the brake levers are released, the elastomer releases the energy absorbed and returns to its original position to keep an adequate braking force and to maintain good brake efficiency.

The above cushion mechanism of the brake is a unitary module and may be fastened onto the prior art brake calipers, thus the cushion mechanism of the invention can be installed and replaced simply without refitting.

The structure and feature of the invention has embodied through the above detailed description and examples. However, it is emphasized that various changes in form may be made thereto, and other embodiments of the invention may be made or practiced without departing from the spirit and scope of the invention as limited solely by the appended claims.

What is claimed is:

1. A cushion mechanism for a brake of a bicycle comprising:

a brake block generally having two parts including a rim contacting end and an engaging end, the rim contacting end adapted to contact the rim of the wheel of a bicycle to cause deceleration, and the engaging end having an engaging means;

an elastomer being penetrated by said engaging end of said brake block and said engaging means of said engaging end protruding out of said elastomer;

a locking means mated with said engaging means of said engaging end protruded out of said elastomer and locked tightly to apply a preset pressure to said elastomer.

2. The cushion mechanism for a brake of a bicycle of claim 1, further comprising a sleeve, and said elastomer enclosed in said sleeve.

3. The cushion mechanism for a brake of a bicycle of claim 2, further comprising a bushing, said bushing being penetrated by said brake block and positioned between said brake block and said sleeve.

4. The cushion mechanism for a brake of a bicycle of claim 3, wherein the inner and outer diameters of said bushing respectively are matched with an inner diameter of said sleeve and the outer diameter of said brake block.

5. The cushion mechanism for a brake of a bicycle of claim 4, wherein said engaging means is in the form of screw and said lock means is of a nut.

6. The cushion mechanism for a brake of a bicycle of claim 5, wherein said screw of said engaging end of said brake block is made to form a plane, an aperture formed in the bottom of said sleeve matched with said plane to inhibit a relative rotation of said screw and said sleeve.

7. The cushion mechanism for a brake of a bicycle of claim 2 is further provided with a fixed bolt with an inner hole formed therein to allow said sleeve to extend through and rest at a position thereon.

8. The cushion mechanism for a brake of a bicycle of claim 3 is further provided with a fixed bolt with an inner hole formed therein to allow said sleeve to extend through and rest at a position thereon.

9. The cushion mechanism for a brake of a bicycle of claim 4 is further provided with a fixed bolt with an inner hole formed therein to allow said sleeve to extend through and rest at a position thereon.

10. The cushion mechanism for a brake of a bicycle of claim 6 is further provided with a fixed bolt with an inner hole formed therein to allow said sleeve to extend through and rest at a position thereon.

11. The cushion mechanism for a brake of a bicycle of claim 7, wherein said fixed bolt is adapted to be fastened to a brake caliper by a nut.

12. The cushion mechanism for a brake of a bicycle of claim 8, wherein said fixed bolt makes contact with the peripheral surface of said sleeve through a set washer, thus to fasten said sleeve.

13. The cushion mechanism for a brake of a bicycle of claim 12, wherein said set washer has a V-shaped end face.

* * * * *